(12) United States Patent
Ouriev et al.

(10) Patent No.: US 8,388,337 B2
(45) Date of Patent: Mar. 5, 2013

(54) PROCESS AND DEVICE FOR CASTING PRODUCTS INTENDED FOR HUMAN CONSUMPTION

(75) Inventors: Boris Ouriev, Niederuzswil (CH); Uwe Steiner, Nümbrecht (DE)

(73) Assignee: Buhler AG, Uzwil (CH)

( * ) Notice: Subject to any disclaimer, the term of this patent is extended or adjusted under 35 U.S.C. 154(b) by 1007 days.

(21) Appl. No.: 12/223,487

(22) PCT Filed: Nov. 20, 2006

(86) PCT No.: PCT/CH2006/000652
§ 371 (c)(1),
(2), (4) Date: Jul. 31, 2008

(87) PCT Pub. No.: WO2007/087731
PCT Pub. Date: Aug. 9, 2007

(65) Prior Publication Data
US 2009/0053376 A1    Feb. 26, 2009

(30) Foreign Application Priority Data

Jan. 31, 2006 (DE) .......................... 10 2006 004 690

(51) Int. Cl.
*B29C 31/04* (2006.01)
(52) U.S. Cl. ........ 425/449; 137/845; 137/846; 137/849; 222/490; 222/528; 222/529
(58) Field of Classification Search ................. 222/203, 222/490, 528, 529; 137/845, 846, 849; 425/449
See application file for complete search history.

(56) References Cited

U.S. PATENT DOCUMENTS

| | | | | |
|---|---|---|---|---|
| 2,296,861 A * | 9/1942 | Matter | ........................ | 118/259 |
| 3,195,786 A * | 7/1965 | Vogt | ............................. | 222/394 |
| 3,377,012 A * | 4/1968 | Cushman | ....................... | 228/40 |
| 3,430,816 A * | 3/1969 | Nadherny et al. | .......... | 222/146.5 |
| 4,566,612 A * | 1/1986 | von Kreuter | ................. | 222/309 |
| 5,012,957 A * | 5/1991 | Mihail | .......................... | 222/190 |
| 5,186,368 A * | 2/1993 | Garcia | .......................... | 222/490 |
| 5,213,236 A * | 5/1993 | Brown et al. | ................. | 222/212 |
| 5,773,039 A * | 6/1998 | Jones | ............................. | 425/186 |
| 5,950,878 A * | 9/1999 | Wade et al. | .................. | 222/207 |
| 6,776,361 B1 * | 8/2004 | Watanabe et al. | ............. | 239/654 |

FOREIGN PATENT DOCUMENTS

DE 1782 745    11/1972
DE 29905283 U1 *  6/1999
(Continued)

Primary Examiner — Robert B Davis
(74) Attorney, Agent, or Firm — Wolff & Samson PC

(57) ABSTRACT

The invention relates to a casting machine for producing a product intended for human consumption from a castable material, in particular a fat material such as chocolate, for example, having a heatable material container for receiving the castable material; at least one nozzle which is in fluid connection with the material container interior, and a pressure source for generating an overpressure in the material container interior. According to the invention, the nozzle has a nozzle orifice or a nozzle constriction, the open cross section or flow cross section of which is flexible. A process according to the invention for producing a product intended for human consumption from a castable material has the following steps: providing a heated castable material in a material container; generating an overpressure in the material container interior; forcing the material through a nozzle in fluid connection with the material container with simultaneous changing of the flow and/or open cross section of the nozzle.

27 Claims, 7 Drawing Sheets

| | FOREIGN PATENT DOCUMENTS | | WO | WO 94/13154 | 6/1994 |
|----|----|----|----|----|----|
| FR | 1183748 | 7/1959 | | | |
| GB | 957996 | 5/1964 | * cited by examiner | | |

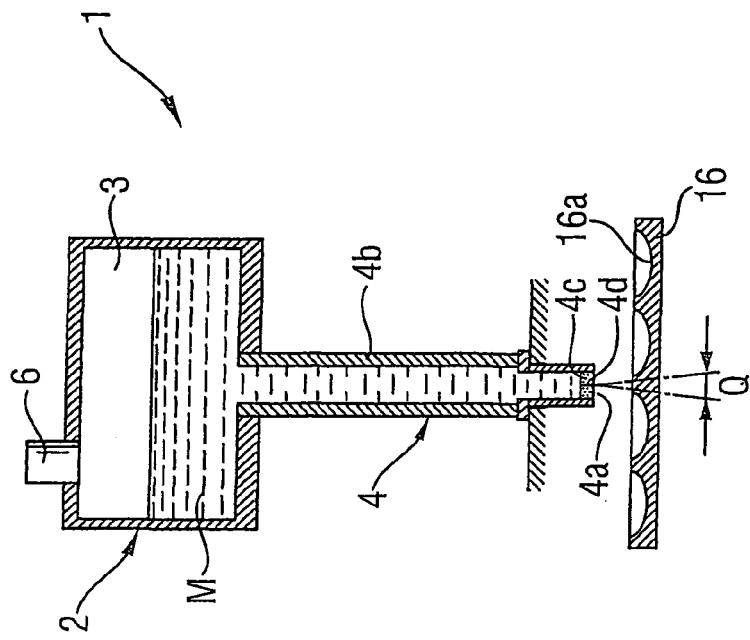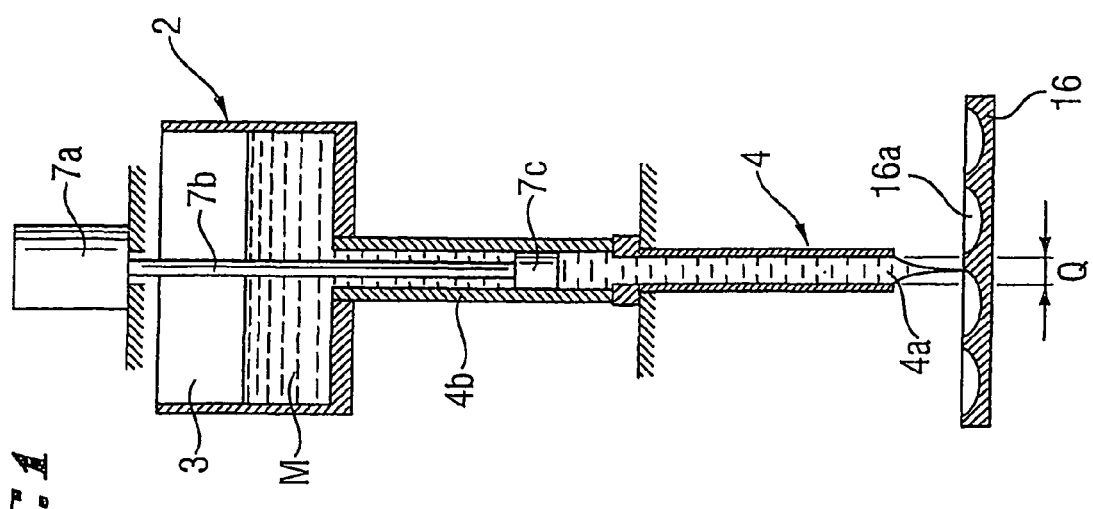

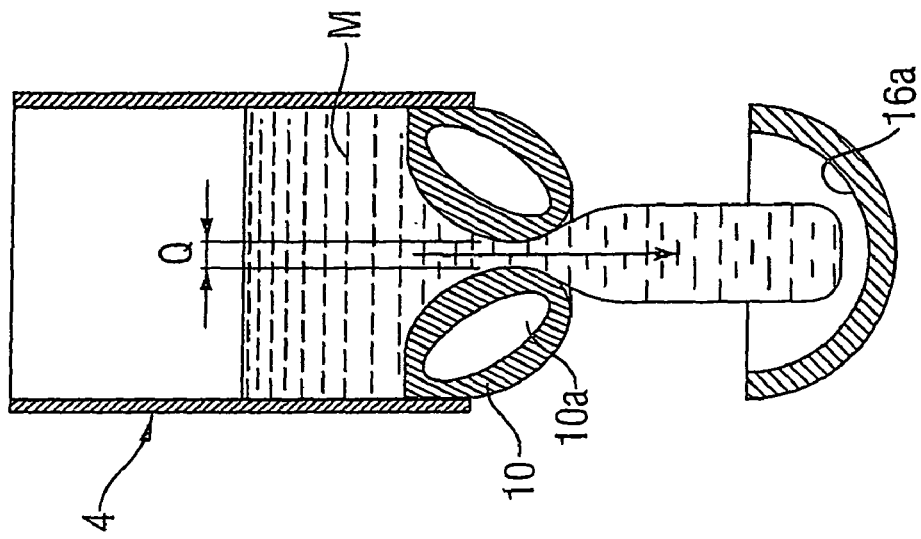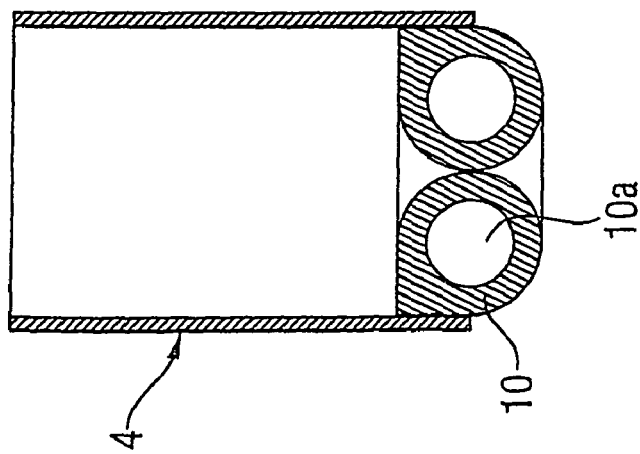

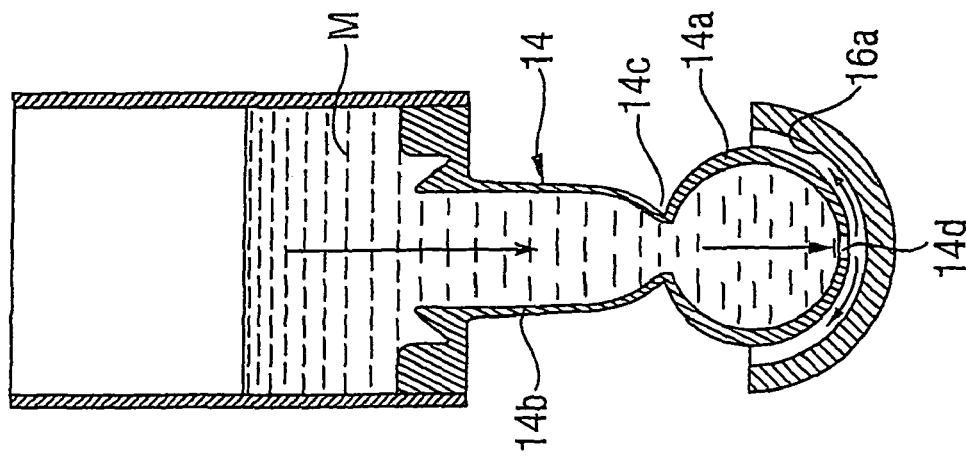
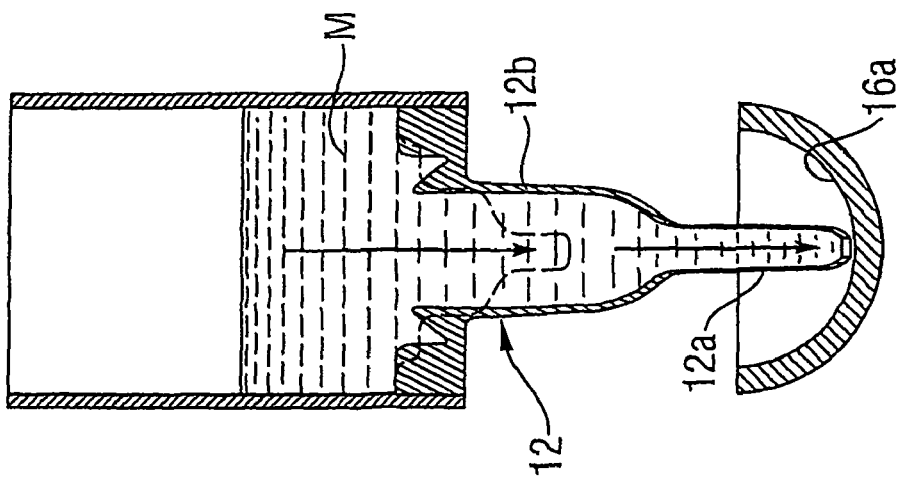

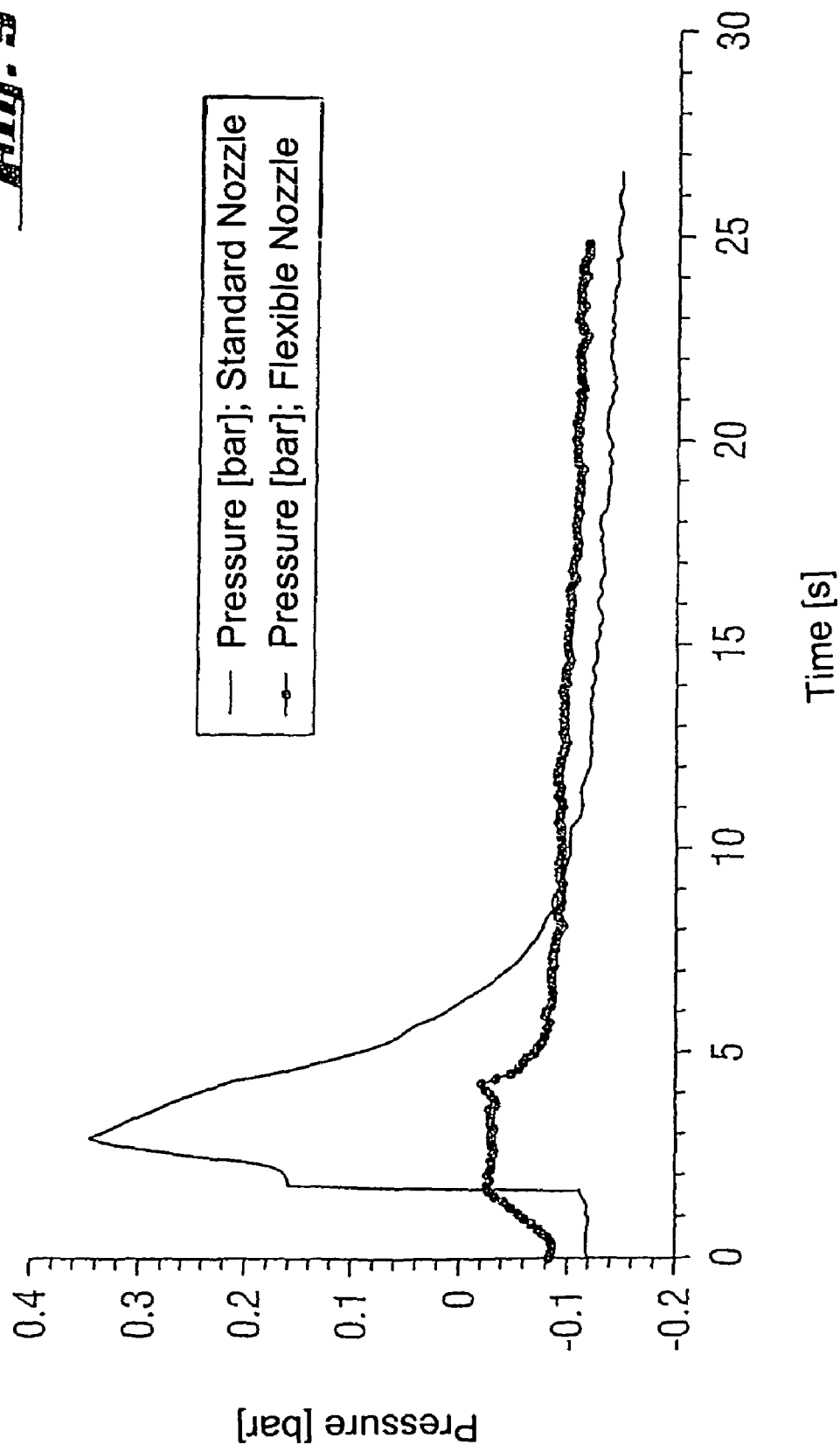

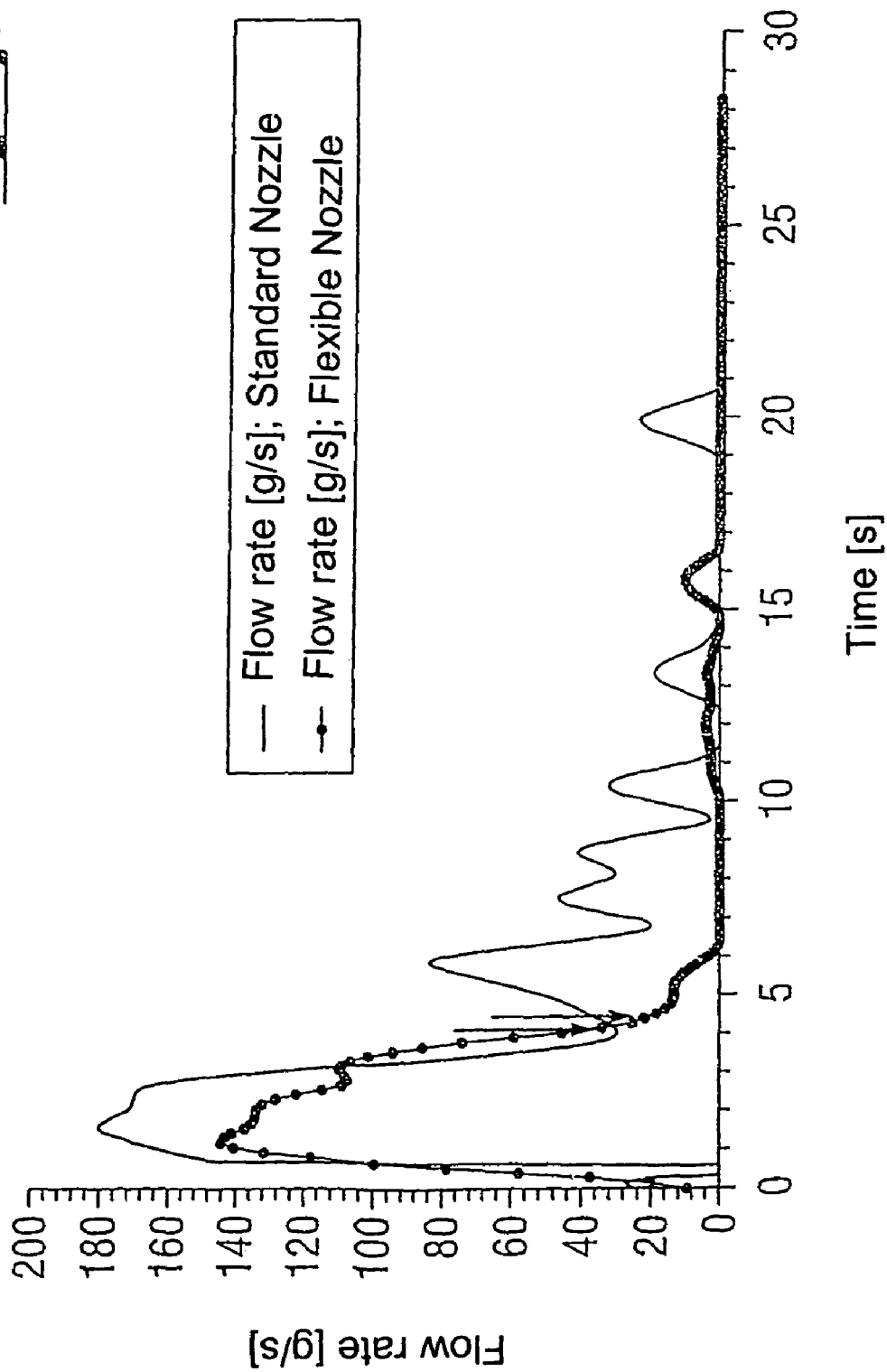

PROCESS AND DEVICE FOR CASTING PRODUCTS INTENDED FOR HUMAN CONSUMPTION

This is a U.S. National Stage of application No. PCT/EP 2006/000652, filed on 20 Nov. 2006. Priority is claimed on that application and on the following application:
Country: Germany, Application No.: 10 2006 004 690
Filed: Jan. 31, 2006.

BACKGROUND OF THE INVENTION

The invention relates to a depositor for the manufacture of a food product from a pourable mass, especially a fatty mass such as chocolate. Depositors of this type have a tempered mass container for holding the pourable mass, at least one nozzle, which is in fluid connection with the interior of the mass container, and also a source of pressure to produce an excess pressure in the interior of the mass container.

In current practice the components of such depositors are made of rigid metal parts. The tempered mass container serves to hold the pourable mass. Pipes lead off from its base, each running into one of a number of chambers, which each have a moveable piston inside. Each of these chambers is then connected with a nozzle. A valve function is provided for each chamber/piston/nozzle unit.

During one suction stroke the respective valves open each of the connecting pipes between the mass container and each chamber, while the respective connecting pipes between each chamber and nozzle are blocked. The respective pistons then move within each chamber so as to increase the free chamber volume, and the mass is drawn into each chamber.

During one expulsion stroke the respective valves close off the connecting pipes between the mass container and each chamber, while the respective connecting pipes between each chamber and nozzle are opened. The respective pistons then move within each chamber so as to reduce the free chamber volume, and the mass is pumped out from each chamber to its assigned nozzle.

The mass coming out from the nozzle is then pressed or poured onto a supporting tray or into a hollow mould.

In the case of some special designs of such depositors, the valve function is coupled with the piston function. For this purpose the piston is for example formed as a basically cylindrical lifting/rotary piston, which is able to move in a linear stroke along the axis of the chamber or piston and also in a rotary motion around the axis of the chamber or piston. By a special arrangement of the inlets from the respective connecting pipes in each chamber wall and corresponding cut-outs and/or openings in the respective pistons, a complete pouring cycle (sucking in and ejecting) can be effected by a sequence of linear and rotary motions of the respective pistons first in one direction and then in the other, opposite direction.

Although it is true that in the latter case of the more compactly built depositors it was possible to reduce the number of moving parts to some extent by combining the piston and valve functions, such conventional depositors still have a large number of moving parts.

What is more, when pouring liquids of low viscosity it is often not possible to avoid some continued flow from the nozzle after the end of the ejection stroke. In most applications where chocolate mass is being poured, the pouring is carried out at such high temperatures that at least the crystalline variants of the triglycerides which melt at lower temperatures are melted, resulting in the chocolate mass as a whole being in a very fluid state, and some continued flow from the nozzles does take place.

Because as a rule only small quantities are poured per pouring cycle, the pouring process takes place almost entirely in the transient (non-stationary) mode. Apart from the continued flow referred to above, and the deviations from the dosage caused at least in part by this, the mainly transient mode of pouring also leads to structural changes in the mass. This can in turn lead to an impairment of the quality of the poured chocolate masses.

Besides this, it is practically impossible under the set conditions of manufacturing output levels (stroke frequency and dosage per stroke) to influence the variation over time of the flow resistance, which is conditioned by the flow properties (viscosity) of the chocolate mass to be poured and by the geometrical parameters.

The absolute pressure which is acting upstream from the nozzle must be sufficiently large to overcome the flow point of the chocolate mass to be poured, at the start of the pouring. This results in a rapid initial increase in pressure. As soon as the flow starts, a much lower pressure is needed to keep a constant flow going. What is more, due to the laminar shear current, with a parabolic kind of current profile, which is now flowing, there takes place a change in the flow properties (viscosity) of the chocolate mass, leading to a reduction in viscosity. Thus the shearing action has a thinning effect here. As a result, the pressure initially required to overcome the flow point of the chocolate mass is much larger than the pressure required to maintain the flow after the flow has started. Now this means that the design of the pressure sources and the robustness of many of the machine parts has to be worked out using this maximum pressure requirement as a basis.

SUMMARY OD THE INVENTION

Therefore the invention has the objective of making available a depositor for manufacture of a food product in the form of a pourable mass, especially of a fatty mass such as chocolate, in which the said disadvantages and shortcomings in pouring can be avoided or at least reduced.

This objective is solved by a depositor having a tempered mass container for holding the pourable mass; at least one nozzle which is in fluid connection with the interior of the mass container; a pressure source for producing an excess pressure in the interior of the mass container, characterised by the nozzle having an orifice whose cross section of flow (wetted section) and/or cross-section of opening is flexible.

This makes possible, firstly, an adjustment of the geometrical constraints of the nozzle, and secondarily, to purposively influence the flow properties of the pourable mass which are determined by the structure of the material. By increasing the nozzle cross-section of flow and/or opening at the start of the pouring process, and preferably reducing the nozzle cross-section of flow and/or opening during the pouring process, an evening out of the pressure sequence over a complete pouring cycle can be achieved.

The nozzle cross-section of flow and/or opening can be controllable, whereby it is especially useful if the opening cross-section of the nozzle orifice is controllable by pressure. For this purpose the absolute pressure in the interior of the mass container can be used. As an alternative or complementary to this, the pressure controlling the nozzle opening can be derived from the pourable mass which is contained in the interior of the mass container and is in contact with the inside wall of the nozzle opening.

Besides this active influencing of the nozzle cross-section, the nozzle can also have a purely passive behaviour in response to flow currents. For this the nozzle has a valve function. This design makes it possible to do without the valve functions added to or in combination with the pistons (linear/rotary pistons), which were described at the beginning.

A specially advantageous embodiment of the depositor according to the invention, is characterised by the nozzle being fitted with a flexible elastic material, especially an elastomer material, at least in the region of the nozzle opening. This enables at least a part of the nozzle to automatically adjust itself to the pressure and current flow conditions during a pouring cycle (passive adjustment). By the elastomer material expanding at the start of the pouring cycle, the pressure peak at the start of the pouring cycle can be significantly reduced, and then once the flow point has been overcome the elastomer material contracts thereby maintaining a high flow velocity and therefore also shear rate in the flow, which leads, in the case of a chocolate mass for example, to a lower viscosity.

It is advantageous to have the nozzle fitted with an elastic component which closes the nozzle opening while in the resting state. This prevents any continued flow after the end of the pouring cycle. The elastic component can be a ring-form component which extends around the nozzle opening.

It is preferable for the nozzle to have an elastic component with a hollow space, which is in fluid contact with a fluid source of variable fluid pressure. In this way the elastic component can be filled with a fluid and inflated to a greater or lesser degree by means of the fluid pressure. Thus during a pouring cycle a purposive active adjustment of the nozzle cross-section and/or the nozzle channel geometry can be achieved (active adjustment). By means of the fluid pressure inside the hollow space in the elastic component, its elasticity and therefore flexibility can be purposively adjusted or adapted to match the flow properties of the mass which is to be poured.

For the pressure source of the depositor, a displacer insertable in the interior of the mass container, especially a plunger or a membrane, can be used. Alternatively a pressurised container with compressed gas, in particular compressed air, can be used as the pressure source for the depositor, which is switchable via a valve in fluid contact with the interior of the mass container. In this manner the necessary pressure can be built up in the mass container, upstream of all the nozzles, in order to press the mass through the respective nozzles.

The mass container of the depositor appropriately contains a gas release vent, to expel compressed gas, in particular compressed air, from the interior of the mass container, in which case the gas release vent of the mass container is preferably to be a gas release valve. In this way the pressure in the mass container upstream of all the nozzles can be reduced, in order to slow down and finally bring to a halt the extrusion of the mass through the respective nozzles.

It is also advantageous if at least some parts of the wall of the mass container are made of a flexible elastic material, especially an elastomer material. This enables the pressure in the interior of the mass container to be controlled via the volume of the interior of the mass container. For this purpose it is preferable that at least a part of the wall of the mass container is formed by a flexible membrane, which can be pressed inward or pulled outward over a large area, so as to increase or reduce the pressure in the interior of the mass container.

It is also possible to make the whole nozzle out of a flexible elastic material, especially an elastomer material. As already explained above, by this an evening out of the pressure sequence during a pouring cycle (passive adjustment) can be achieved. The nozzle is preferably to be fixed directly onto the wall of the mass container, i.e. a connecting pipe between the mass container and the nozzle is not necessary. This simplifies the construction of the depositor according to the invention. In particular it does away with the need for a costly heating of such connecting tubes. There is, moreover, the added advantage that when the mass to be poured (e.g. chocolate mass), after spending some times in the mass container where it is conditioned thermally and/or mechanically (shear and/or vibration) as appropriate, arrives in the nozzle and still exhibits a clearly defined structure due to this conditioning, because there is no need for transport via a connecting tube.

The flexible nozzle can feature a slitted section, a bellows-type folded section, an extendable section, a section which can be turned inside out like the fingers of a glove, or some combination of these.

In the case of a "slit nozzle", there is at least one slit e.g. at the nozzle end. This preferably consists of a cross-shaped slit consisting of two slits crossing at right angles or a star-slit made of three or more slits crossing each other like a star.

In the case of a "bellows nozzle" the nozzle has a bellows design with bellow-type folds arranged transversely to the lengthwise axis of the nozzle. This enables the length of the nozzle to be varied by the fluid pressure of the mass in the interior of the nozzle.

The "expandable nozzle" works in a similar way. The elastomer nozzle material is moulded in such a way that it forms a relatively short nozzle when in the undistended relaxed state. Only when the nozzle material is stretched by the application of pressure in the interior of the nozzle does the nozzle then become longer and can e.g. be lengthened up to a desired target length.

In the case of an "invertible nozzle" the elastomer nozzle material is moulded in such a way that the nozzle in its undistorted relaxed state extends into the interior of the mass container. Only when the nozzle material is distended by pressure applied in the interior of the nozzle does the nozzle become inverted inside-out, and can again be lengthened up to a desired target length.

The nozzle is appropriately set up with a receiving area for the mass to be deposited through the nozzle. This may be quite simply a supporting surface, a conveyor belt or suchlike. In particular the receiving area can be a hollow mould into which the mass is poured through the nozzle. It is preferable to have this receiving area tempered, to ensure an optimal solidification of the poured mass.

The receiving area may also be a container filled with a receiving fluid. Particularly suited for this is e.g. a liquid-filled basin and/or a gas fluidized bed. The liquid-filled basin can serve to cool the units of deposited mass e.g. by water, or for enrobing the units of deposited mass e.g. with a specially coloured coating having a special flavour.

Preferably each of the nozzles has at least one pressure sensor for registering the pressure in its interior. It is preferable that the mass container, too, has at least one pressure sensor for registering the pressure in its interior.

This makes it possible to carry out a depositing process which is affected by pressure changes in the interior of the mass container and in the nozzle, as well as by changes in the shape of the nozzle. Here there is an interplay between nozzle flexibility, determined by the nozzle shape and elasticity, and the pressures in the mass container and in the nozzles.

Thus the "soft depositor" according to the invention has at least flexible nozzles, whose flexibility is adjustable and therefore can be adapted to match the flow characteristics of the mass which is to be deposited.

For solving the objective the invention also offers a process whereby a tempered pourable mass is made ready in a mass container, an excess pressure is set up in the interior of the mass container, and the mass is pressed out through a nozzle which is in fluid contact with the mass container, while at the same time varying the nozzle cross-section of flow and/or opening.

It is preferable to measure the pressure of the mass pressed through the nozzle, at least while it is being pressed through the nozzle, and here it is advantageous to use the measured pressure of the mass as the basis for controlling the nozzle cross-section of flow and/or opening.

Here the change of the nozzle cross-section of flow and/or opening is carried out either by passive adjustment or by active adjustment or by a combination of passive and active adjustment.

A passive adjustment takes place where the nozzle, at least some parts of which are flexible, automatically adjusts itself to match the flow and pressure conditions.

An active adjustment is performed by controlling the nozzle, at least some parts of which are flexible, so as to adapt it to match the flow and pressure conditions during the depositing. It is preferable to control the flexible part of the nozzle in a way which changes its elasticity and/or shape and therefore its flexibility.

BRIEF DESCRIPTION OF THE DRAWINGS

Further advantages, features and possible applications of the invention can be seen from the description, which is not to be taken as restrictive, of preferred embodiments of the depositor and nozzles according to the invention, which now follows, where:

FIG. 1 schematically shows the construction of a conventional depositor in a partially cut-out view;

FIG. 2 schematically shows the main construction of a depositor according to the invention in a partially cut-out view;

FIG. 5 schematically shows, in a sectional view, the construction of a first design of the nozzle of the depositor according to the invention in a first operating state;

FIG. 6 schematically shows, in a sectional view, the construction of a first design of the nozzle of the depositor according to the invention in a second operating state;

FIG. 7 schematically shows, in a sectional view, the construction of a second design of the nozzle of the depositor according to the invention in a first operating state (dotted lines) and in a second operating state (continuous lines);

FIG. 8 schematically shows, in a sectional view, the construction of a third design of the nozzle of the depositor according to the invention;

FIG. 9 shows the variation of pressure over time during a pouring process in a conventional depositor (with rigid nozzle) and in a depositor according to the invention (with flexible nozzle); and FIG. 10 shows the variation of the mass flow over time during a pouring process in a conventional depositor (with rigid nozzle) and in a depositor according to the invention (with flexible nozzle).

DETAILED DESCRIPTION OF THE INVENTION

Figure 3:
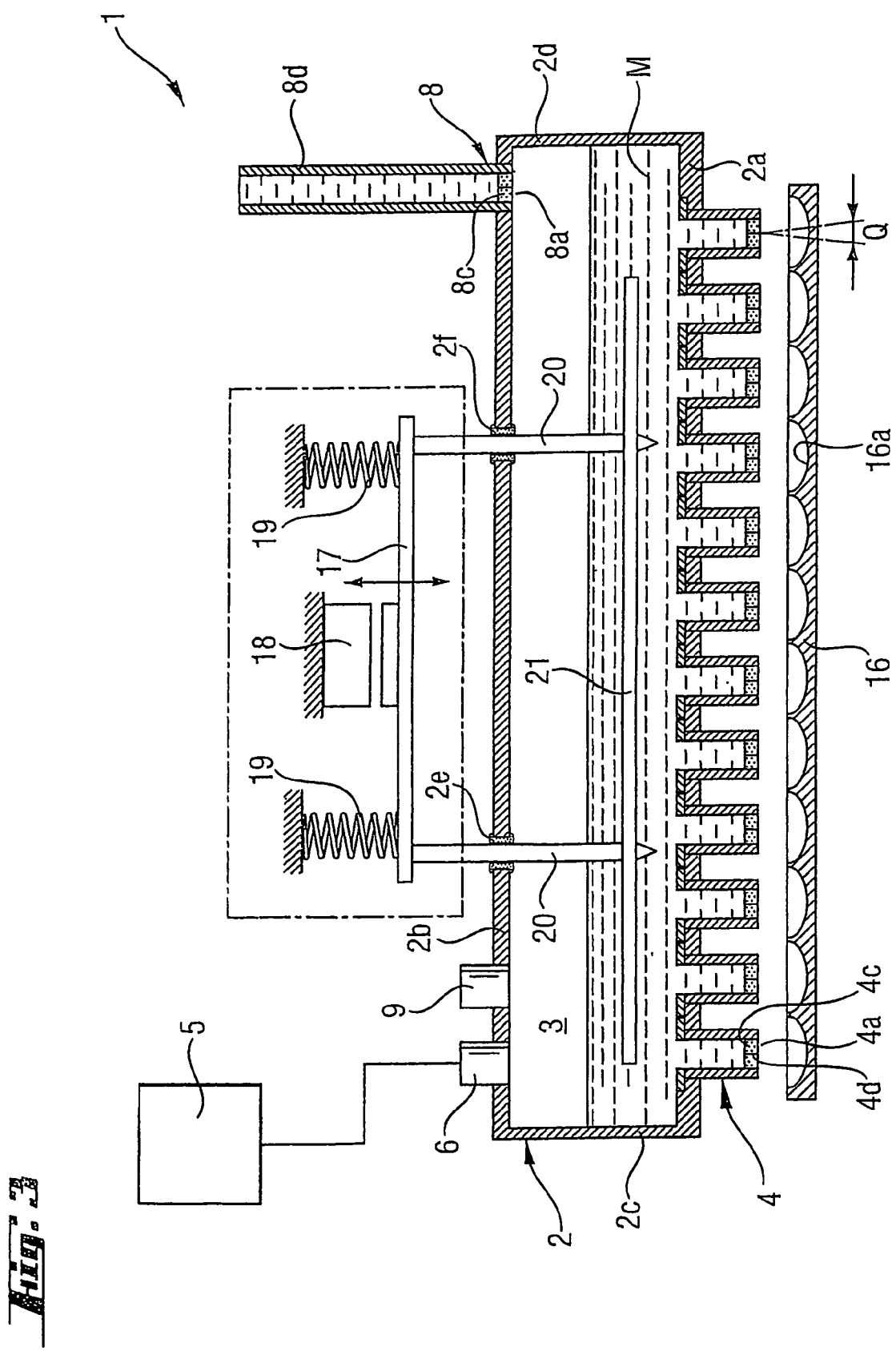
FIG. 3 schematically shows the construction of a first design example of the depositor according to the invention in a partially cut-out view.

FIG. 1 schematically shows the construction of a conventional depositor in a partially cut-out view. The depositor consists of a mass container 2 for holding a pourable mass M, such as a chocolate mass, a nozzle 4 with a nozzle opening 4a at the lower end of the nozzle, and a pressure source, which is formed by a drive 7a, a piston rod 7b and a piston 7c. The piston 7c is mounted with a plain bearing in an upper section 4b of the nozzle 4. Below the nozzle 4 there is placed in position a mould 16 with a number of alveoli or cavities 16a. All components 2, 4, 7b, 7c of this depositor which come into contact with the mass M to be poured are rigid parts.

During operation the drive 7a moves the unit comprising piston rod 7b and piston 7c downwards, to press the mass M in the nozzle 4 through the nozzle opening 4a. In this way a quantity of the mass M corresponding to the piston stroke in the nozzle 4 is deposited in each of the alveoli 16a, which are located below the nozzle 4.

When molten chocolate mass is poured using such a conventional depositor, a continued dripping or flowing out of chocolate mass from the nozzle 4 after the actual pouring process cannot be ruled out. This can adversely influence the accuracy of dosage and the appearance of the deposited chocolate items.

FIG. 2 schematically shows the main construction of a depositor 1 according to the invention in a partially cut-out view. The depositor 1 consists of a mass container 2 for holding a pourable mass M, such as a chocolate mass, a nozzle 4 with a nozzle opening 4a at the lower end of the nozzle and a pressure valve 6, which is connected to a pressure source (which is not shown). It is preferable to use compressed air as the pressurizing medium, which is produced in a compressor (not shown) and stored in a pressurized air container (also not shown), which is in fluid contact with the pressure valve 6. Below the nozzle 4 there is again placed in position a mould 16 with a number of alveoli or cavities 16a.

In contrast to the conventional depositor schematically shown in FIG. 1, in the depositor according to the invention 1, shown in FIG. 2, not all the components coming into contact with the mass to be poured M are rigid parts. Rather at the lower end of the nozzle 4 there is a membrane 4c made of an elastomer material, positioned in the nozzle opening 4a. This membrane has one or more slits 4d. The pourable mass M is retained in the interior of the nozzle 4 when the membrane is closed, i.e. the slit is not spread open. Contributing to this are also the surface tension of the mass M, its flow point and its adhesion to the inside wall of the nozzle 4.

During operation pressurized air or another gas or gas mixture is fed into the interior 3 of the mass container 2 via the pressure valve 6, causing the pressure in the interior 3 of the mass container 2 to rise. By this increase in pressure the mass M is pressed out from the mass container 2 and downwards out from the interior of the nozzle 4, causing the membrane 4c to extend elastically and the one slit or the many slits 4d of the membrane 4c to spread open. Thus the mass M in the nozzle 4 is pressed through the opened slit membrane 4c, so that a quantity of the mass M corresponding to the excess pressure in the mass container 2 is extruded into each of the alveoli 16a which are located underneath the nozzle 4.

In contrast to the nozzle orifice 4a of unvarying cross-section Q in the conventional depositor in FIG. 1, the depositor according to the invention 1 has a nozzle 4 with a variable opening cross-section Q, which is formed by the flexible slit membrane 4c made of elastically extendable material.

Instead of a slitted membrane 4c of elastomer material, a membrane featuring a hole or a number of holes can be used. A "sieve membrane" of this type helps to secure uniform flow conditions across the whole nozzle cross-section.

In the depositor 1 according to the invention (FIG. 2), it is also possible to omit the upper section 4b of the nozzle 4 which is needed for the dosing stroke of the piston 7c (FIG. 1) in the conventional depositor. This then results in a very short nozzle 4 in the floor of the mass container 2. In the extreme case the actual nozzle 4 can also be designed without any vertical length, i.e. the nozzle opening 4a is an opening in the floor plate of the mass container 2, and the flexible slit membrane 4c is located in this opening. In this way a very compact depositor 1 according to the invention can be produced. It is preferable to provide a number of nozzles 4, i.e. a number of nozzle openings 4a each with a slit membrane 4c, in the floor of the mass container. By this one can not only do without the pistons and rods allocated to each nozzle, one also obtains a depositor with a very compact build.

FIG. 3 schematically shows the construction of a first design example of the depositor 1 according to the invention in a partially cut-out view. The mass container 2 has a relatively large floor area and roof area, combined with a relatively low height. A number of nozzles 4 of short form are mounted in the floor plate 2a of the mass container 2, each with a nozzle opening 4a fitted with e.g. a slit membrane 4c or another type of perforated membrane, such as a sieve membrane. In the roof plate 2b of the mass container 2 there is fitted a pressure valve 6 and also a gas release valve 9 with a degassing vent. The pressure valve 6 is in fluid contact with a pressurized container 5. The gas release valve 9 may be constructed in a similar way to the nozzle 4, i.e. it can have a flexible membrane with slits and/or holes in the degassing vent. Below the mass container 2 and the nozzles 4 is positioned a mould 16 with a number of alveoli 16a, where each nozzle 4 is allocated one alveolus 16a, or can be allocated one by a relative motion between the mass container 2 and the mould 16. Preferably the mould 16 is moved, while the mass container 2 remains in its resting position.

Moreover the depositor 1 according to the invention is equipped with an intake valve 8 to an inlet 8a in the roof plate 2b. Fluid chocolate is poured via a feed pipe 8d through this inlet 8a into the mass container 2. This opening 8a, too, is fitted with a valve function, to prevent compressed air or another gas or gas mixture from escaping out of the interior 3 of the mass container 2 into the feed pipe 8d. The valve used for this purpose can also be constructed in a similar way to the nozzle 4, i.e. it can have a flexible membrane 8c with slits and/or holes in the inlet opening 8a.

The mass container 2 has side walls 2c, 2d with a relatively low height. It is important that over the whole floor area of the mass container 2 the pressure conditions are evenly distributed and the mass M is in a homogeneous state. This is achieved by keeping the mass M to be deposited in what is effectively a quasi-stationary state, and only small flow speeds, caused by the pouring, take place in the mass M in the mass container 2. Besides, the quasi-stationary mass M in the mass container 2 is uniformly conditioned across the whole floor area of the container 2. For this purpose an extensive mesh-type or grid-type tool 21 is provided, which mainly runs parallel to the floor plate 2a of the mass container 2 and inside the mass M to be deposited. The tool 21 can be a grid, a perforated plate, a wire mesh or some such similar structure. It is connected via vertical connecting rods 20, which extend via sealed channels 2e, 2f through the roof plate 2b of the mass container 2, to a vibrator unit, which is fitted with a base frame 17, a vibration source 18 and also several springs 19. By means of this vibrator unit the tool 21 can be moved up and down in the mass M. In this manner shearing strains and expansion strains can be introduced in a controlled way into the mass M to be deposited. In the case of chocolate this can, for example, be used to obtain a reduction in viscosity.

Besides this mechanical conditioning (shearing action, expansion of the mass), a thermal conditioning of the mass M (tempering) can also be carried out. For this purpose, heating units (not shown) are provided in or on the walls, preferably in or under the floor plate 2a, of the mass container 2, which can be used to heat the container walls. Alternatively, or additionally, the tool 21 is heated, so that the thermal conditioning can be carried out evenly over the whole area of the mass container 2.

Figure 4:
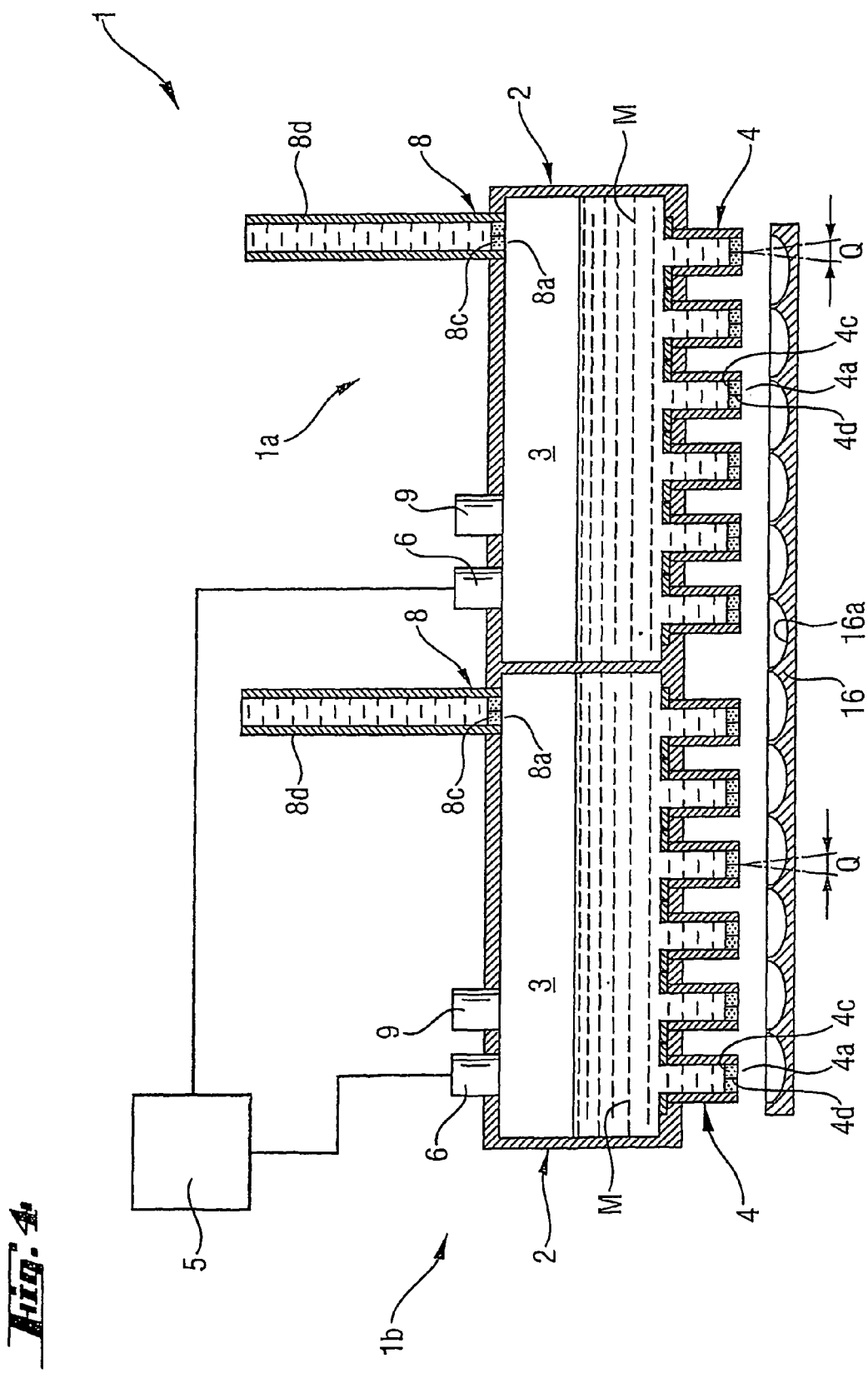
FIG. 4 schematically shows the construction of a second design example of the depositor according to the invention in a partially cut-out view.

FIG. 4 schematically shows the construction of a second design example of the depositor 1 according to the invention in a partially cut-out view. This depositor 1 consists of two depositors 1a, 1b according to the invention, arranged side by side, which are each of a construction identical or similar to the depositor according to the invention shown in FIG. 3. For the sake of clarity in FIG. 4 the tool 21 and the vibrator unit 17, 18, 19, 20, 21 (see FIG. 3) of each of the depositors 1a and 1b is left out. By such an arrangement of two or several depositors 1a, 1b according to the invention etc., different masses M can be processed together to form single deposited items. For example different types of chocolate, differing in their composition (recipe) and/or in their conditioning treatment (applied shear, tempering), can be processed to form a single confectionary item.

The process according to the invention can be performed using the depositor 1 according to the invention shown in FIG. 2, FIG. 3 and FIG. 4.

Here the pourable mass, such as chocolate, is made ready in the mass container 2. The mass in the mass container 2 is thermally and mechanically conditioned, for which purpose the tool 21 (see FIG. 3) is moved up and down in the mass container. The movement of the tool 21 can be adjusted as required, that is one can adjust on the one hand the amplitude and on the other hand the frequency of the tool. For processing the chocolate mass one adjusts the temperature of the mass in the container 2 to a value of from about 30° C. to about 32° C., while for the vibration of the tool 21 one selects an amplitude of from 1 mm to 20 mm and one selects a frequency of from 1 Hz to 200 Hz. In this way it is possible to set clearly defined flow properties for the mass or chocolate to be deposited.

To initiate the pouring process, an excess pressure is then generated in the interior of the mass container 3. For this the pressure valve 6 is opened, so that pressurised air or another compressed gas or mixture of gases flows from the pressure source 5 into the interior 3 of the mass container 2. By this excess pressure the mass M is evenly extruded from the flexible nozzles 4 into the alveoli 16a.

Instead of the pressure valve 6 fixed at a single point on the roof plate 2b of the mass container 2, one can also provide pressure pipes (not shown) distributed evenly across the whole roof plate 2b, opening into the interior 3 of the mass container 2. These either each have their own pressure valve at their opening, or they branch out from a common pressure pipe in which then just a single pressure valve is fitted.

Instead of one or several pressure valves 6, a large-surface gas-tight membrane (not shown) can be provided in one or more walls of the mass container 2. This membrane is preferably located in the roof plate 2b of the mass container 2. By pressing in this membrane, an excess pressure can then be produced in the mass container 2, causing the mass M to be pressed through the nozzles 4. The membrane has then to be moved back. This causes a negative pressure in the mass container 2, which is equalized by suitable intake valves (not shown).

The membrane is preferably an elastic membrane. When this elastic membrane is released, it automatically moves back again, and the resulting negative pressure sucks air or another gas or gas mixture into the mass container 2 via the said intake valves.

It is particularly advantageous if the elastic membrane in the roof plate 2b of the mass container 2 is porous, so that when there is a pressure difference between the inside and the outside of the membrane only a relatively slow pressure equalization takes place by the passage of the gas molecules flowing through. By pressing such an elastic and porous membrane inward, at first a ram pressure builds up due to the flow resistance of the porous membrane. This excess pressure, however, remains for sufficiently long to press a certain identical quantity of the mass M through each of the identical flexible nozzles 4. Typically the pressing inward of the porous elastic membrane takes place within a period of less than one second, while the pressure equalization through the membrane and its return movement take place over a period of from two to a few seconds.

During the return movement of the membrane a small negative pressure arises in the mass container 2, which together with the flexible nozzle 4 contributes to preventing a continued flow or dripping of mass M through the nozzles 4 after the depositing.

Vibrating the tool 21 (see FIG. 3) not only contributes to the conditioning, i.e. the adjusting of the rheological properties of the mass M, it also helps in degassing the mass M, i.e. in venting air bubbles or other gas bubbles out from the mass M.

According to the invention, during the pressing of the mass M through a nozzle 4 which is in fluid contact with the mass container 2, the cross-section of flow and/or opening Q of the nozzles 4 is changed. This altering of the opening cross-section Q can be done actively or passively. In the case of active alteration of the cross-section Q, a nozzle 4 with an actively deformable, flexible element is used; while in the passive alteration of the cross-section Q a nozzle 4 with a passively deformable, flexible element is used.

Preferably the pressure of the mass being pressed through the nozzle is measured at least during the pressing of the mass M through the nozzle 4. The measured pressure of the mass is then used, for example, as a basis for controlling the cross-section of flow or opening Q of the nozzle 4. Alternatively or additionally the measured pressure in the nozzle 4 can also be used for controlling the pressure applied in the mass container 2. Here in particular the opening of the pressure valve 6 or the pressing inward of the porous elastic membrane is controlled on the basis of this measured pressure.

FIG. 5 schematically shows, in a sectional view, the construction of a first design of the nozzle 4 of the depositor according to the invention 1 in a first operating state (resting state without flow passing, nozzle closed). The nozzle 4 shown here has a flexible section 10 made of a rubbery elastomer material. This flexible section 10 has a hollow cavity 10a and is located at the lower end of the nozzle. In the present case the flexible section 10 consists of an element which is toroidal in shape when in an undeformed state. The flow resistance of the nozzle 4 can be adjusted by the choice of elastomer material (hardness of the rubber) and by the geometrical shape (large radius of toroid, small radius of toroid, wall thickness of toroid). Furthermore, the hollow space 10a can be filled with a fluid. This allows one to also adjust the flexibility of the flexible section or its flow resistance. For the fluid a compressible fluid such as air or another gas or gas mixture, or an incompressible fluid such as water or an oil, can be used. The hardness of the toroid or tube can be adjusted via the pressure of the compressible fluid, and by using an incompressible fluid fill it is also possible to adjust the deformation resistance caused by the internal friction of the fluid fill.

A particularly "intelligent" flow-adaptive nozzle 4 is obtained when the elastic section of the nozzle 4 is provided with both a first hollow space for an incompressible fluid and also a second hollow space for a compressible fluid. By this means the deformation properties of the flexible section (hardness, deformation resistance etc.) can be adjusted across a large range. Preferably the first hollow space is in fluid contact with a variable pressure source for the incompressible fluid, and/or the second hollow space is in fluid contact with a variable pressure source for the compressible fluid. This enables a control of the nozzle flexibility or nozzle flow resistance. Measurement data about the mass flow through the nozzles 4 can be used for this control, such as the pressure of the mass in the nozzle 4 or the flow velocity or throughput of mass through the nozzle 4. In this way the nozzles 4 can be regulated, and the depositing process can be rheologically optimized. What is more a continued flow or dripping of the mass M at the end of the depositing process is prevented.

FIG. 6 schematically shows, in a sectional view, the construction of a first design of the nozzle of the depositor according to the invention in a second operating state (depositing state with flow passing, nozzle opened). By the pressure conveyed via the mass container 2 (see FIG. 2, FIG. 3, FIG. 4), the mass M has deformed the flexible section 10 and opened the nozzle 4 which had at first been closed. The opening cross-section Q, and the throughput through the nozzle 4 which is related to this, result from the pressure of the mass M and from either the preset nozzle (passive nozzle), or the nozzle controlled or regulated during the depositing (active nozzle), as the case may be. In this way a quantity of the mass M which is of a set dosage and a defined structure can be deposited into the alveolus 16a.

FIG. 7 schematically shows, in a sectional view, the construction of a second design of the nozzle of the depositor according to the invention in a first operating state (dotted lines) and in a second operating state (continuous lines). In the first operating state (resting state without flow passing) this nozzle 12, which can be telescopically extended by the pressure of the mass, is closed at its lower end. In the second operating state (depositing state with flow passing), this nozzle 12 is in a state where it is extended downwards by the pressure of the mass. The lower section 12a of the nozzle 12 is somewhat narrower than the upper section 12b. This telescopic nozzle is a passive nozzle. An important advantage is that besides suppressing any continued flow or dripping, it prevents damage to the nozzle tip 12a (breakage, folding back) or damage to the alveolus 16a (scratching), should the nozzle 12 be driven too close to the alveolus 16a.

FIG. 8 schematically shows, in a sectional view, the construction of a third design of the nozzle of the depositor according to the invention. Only the extended state of the nozzle 14, with the mass flowing through, is shown. Similar to the telescopic nozzle shown in FIG. 7, this special telescopic nozzle 14 consists of an upper section 14b and a lower section 14a. While the upper section 14b primarily extends along its length, i.e. vertically, to arrive at the state depicted, the lower section 14a balloons out to form a ball shape. Between the upper section 14b and the lower section 14a there is a constriction 14c, which is less easily or not at all extendable. To achieve this the nozzle 14 made of elastomer material can be thicker in the region of the constriction 14c, or it can have a rigid ring there (not shown). Preferably the nozzle 14 is driven close enough to the alveolus 16a by the lengthwise extension of the upper section 14b and by the inflation of the lower section 14a, so as to form a hollow region between the surface of the nozzle in the lower section 14a and the surface of the alveolus 16a, in which the mass M, streaming out from a hole 14d in the lower end of the nozzle, is evenly distributed.

In this manner it is possible to manufacture, for example, chocolate shells. The radius of curvature of the balloon-type inflatable lower section 14a of the nozzle 14 and the radius of curvature of the alveolus 16a can be matched to each other in such a way that the hollow space between the balloon-type section 14a and the alveolus 16a is closed off at the top. In this way it is possible to produce chocolate shells with a defined volume. Preferably the radius of curvature of the outside surface of the balloon-type section 14a is larger than the radius of curvature of the concave inner surface of the alveolus 16a. Alternatively an extending lap or bulge can be provided approximately halfway up the outer surface of the balloon-type section 14a, in order to close off to the outside the hollow space between "stamp" 14a and alveolus 16a, while carrying out a combined pouring and stamping. This enables one to achieve a defined shape of edge for the chocolate shells. What is more, the tolerances, due to the manufacturing process, of the volume of the cavity between the alveolus 16a and the stamp or balloon 14a can be evened out. The chocolate shells made in this way then just have a pouring ridge in the middle of their inner surface. The edge of the shell, however, has a defined shape.

This telescopic stamp nozzle 14 makes possible a process for manufacture of chocolate shells similar to cold stamping or cold pressing. Here instead of cooling the stamp one uses a cooling of the mould 16 which contains the alveoli 16a (see FIG. 2, FIG. 3, FIG. 4). In this way the conventional cold stamping can be made more flexible.

FIG. 9 shows the variation in pressure over time during a depositing process in a conventional depositor (with rigid nozzle) and in a depositor 1 according to the invention with a flexible nozzle 4. While in the case of the conventional rigid nozzle a very pronounced pressure peak is produced in the nozzle (thin line) during the pouring or pressing of the mass through the nozzle, in the case of pouring or pressing the mass M through the flexible nozzle 4 according to the invention hardly any pressure peak is produced (line along the bold dots). Instead there results a very flat pressure curve running at a relatively low level. This enables the depositor 1 according to the invention to be made correspondingly lighter and smaller in size. And the pressure sources of the depositor 1 according to the invention do not have to be so heavily built, either. Therefore the flexible depositor 1 according to the invention can not only be constructed with a very much smaller number of moving parts than a conventional depositor made of rigid components, it can as a whole be made much smaller in size and needs less mechanical energy than a conventional depositor.

FIG. 10 shows the variation of the mass flow over time during a pouring process in a conventional depositor (with rigid nozzle) and in a depositor 1 according to the invention with flexible nozzle 4. One sees that in the case of the conventional depositor with rigid nozzle a pronounced continued flow or dripping takes place after the depositing (thin line, after c. 5 seconds), while in the case of the depositor 1 according to the invention with flexible nozzle 4 practically no continued flowing or dripping takes place (line along the bold dots, after c. 5 seconds).

The present invention is not restricted to the examples shown here. Thus for example one could use flexible nozzles with two or more concentric channels. This allows a more flexible handling of the conventional one-shot process.

The invention claimed is:

1. A depositor for manufacture of a food product made of a pourable mass, the pourable mass being a fatty food product mass, comprising:
    a common tempered mass container for receiving the pourable mass;
    a plurality of nozzles in fluid contact with an interior of the common tempered mass container; and
    a common pressure source for producing an excess pressure in the interior of the common tempered mass container, each of the plurality of nozzles having a nozzle opening or nozzle constriction whose cross-section of opening or flow is flexible.

2. The depositor according to claim 1, wherein the cross-section of opening or flow of an orifice of each of the plurality of nozzle is controllable.

3. The depositor according to claim 2, wherein the cross-section of opening of the orifice of each of the plurality of nozzles is controllable by pressure.

4. The depositor according to claim 3, wherein the cross-section of opening of the orifice of each of the plurality of nozzles is controllable by an absolute pressure in the interior of the common tempered mass container.

5. The depositor according to claim 3, wherein the pressure which controls the nozzle opening of each of the plurality of nozzles being effected by the pourable mass which is contained in the interior of the common tempered mass container and which is in contact with an inside wall of the nozzle opening of each of the plurality of nozzles.

6. The depositor according to claim 1, wherein each of the plurality of nozzles provides a valve function.

7. The depositor according to claim 1, wherein each of the plurality of nozzles is fitted with a flexible elastic material, at least in a region of a nozzle opening.

8. The depositor according to claim 7, wherein the flexible elastic material is an elastomer.

9. The depositor according to claim 7, wherein each of the plurality of nozzles is fitted with a flexible elastic material that closes off the nozzle opening of each of the plurality of nozzles in its resting state.

10. The depositor according to claim 7, wherein the elastic element is a ring-type element, which extends around the nozzle opening of each of the plurality of nozzles.

11. The depositor according to claim 1, wherein each of the plurality of nozzles is fitted with an elastic element having a hollow cavity which is in fluid contact with a source of fluid having a variable fluid pressure.

12. The depositor according to claim 1, wherein the common pressure source is a displacer which can be pushed into the interior of the common tempered mass container.

13. The depositor according to claim 12, wherein the displacer is a stamp or membrane.

14. The depositor according to claim 1, wherein the common pressure source is a pressurized container filled with a compressed gas, which is in fluid contact, switchable via a valve, with the interior of the common tempered mass container.

15. The depositor according to claim 14, wherein the compressed gas is compressed air.

16. The depositor according to claim 14, wherein the common tempered mass container has a gas release vent for expelling compressed gas out of the interior of the common tempered mass container.

17. The depositor according to claim 16 wherein the gas release vent of the common tempered mass container is a gas release valve.

18. The depositor according to claim 3, wherein at least some parts of the wall of the common tempered mass container are made of a flexible elastic material.

19. The depositor according to claim 18, wherein the pressure in the interior of the common tempered mass container is controllable by the volume of the interior of the common tempered mass container.

20. The depositor according to claim 7, wherein each of the plurality of nozzles nozzle is made of a flexible elastic material.

21. The depositor according to claim 20, wherein each of the plurality of nozzles has a section that is slitted and/or bellows-type folded, and/or glove-finger type invertible.

22. The depositor according to claim 1, wherein each of the plurality of nozzles has a receiving area for the mass deposited through each of the plurality of nozzles.

23. The depositor according to claim 22, wherein the receiving area is a hollow mould.

24. The depositor according to claim 23, wherein the receiving area is a receptacle filled with a receiving fluid.

25. The depositor according to claim 24, wherein the receiving area is a fluid-filled basin or a gas fluidized bed.

26. The depositor according to claim 1, wherein each of the plurality of nozzles is fitted with at least one pressure sensor for measuring the pressure in each of the plurality of nozzles.

27. The depositor according to claim 1, wherein the common tempered mass container has at least one pressure sensor for measuring the pressure in the interior of the common tempered mass container.

* * * * *